United States Patent [19]

Bloemendaal

[11] Patent Number: 4,779,323

[45] Date of Patent: Oct. 25, 1988

[54] FLUID SHEAR COUPLING APPARATUS

[75] Inventor: Brent J. Bloemendaal, Indianapolis, Ind.

[73] Assignee: Household Mfg., Inc., Prospect Heights, Ill.

[21] Appl. No.: 928,607

[22] Filed: Nov. 3, 1986

Related U.S. Application Data

[63] Continuation of Ser. No. 778,296, Sep. 20, 1985, abandoned, which is a continuation of Ser. No. 423,823, Sep. 27, 1982, abandoned.

[51] Int. Cl.$^4$ ............................................. B23P 11/00
[52] U.S. Cl. ..................................... 29/434; 29/527.5; 29/DIG. 5; 29/DIG. 25; 192/58 B; 192/82 T
[58] Field of Search ............... 29/156.8 R, 156.4 R, 29/527.5, 434, DIG. 5, DIG. 25; 164/DIG. 10; 192/58 B, 82 T; 403/335, 336, 338

[56] References Cited

U.S. PATENT DOCUMENTS

| | | | |
|---|---|---|---|
| 2,079,460 | 5/1937 | Marty | 403/336 X |
| 3,007,560 | 11/1961 | Weir | 192/58 B |
| 3,011,607 | 12/1961 | Englander | 192/58 B |
| 3,144,922 | 8/1964 | Weir | 192/82 T |
| 3,191,733 | 6/1965 | Weir | 192/58 B |
| 3,323,623 | 6/1967 | Roper | 192/58 B |
| 3,490,686 | 1/1970 | Weir | 192/82 T |
| 3,809,197 | 5/1974 | Clancey | 192/58 B |
| 3,856,122 | 12/1974 | Leichliter | 192/58 B |
| 3,964,582 | 6/1976 | Mitchell | 192/58 B |
| 4,007,819 | 2/1977 | Maci | 192/58 B |
| 4,036,339 | 7/1977 | Kikuchi | 192/58 B |
| 4,062,432 | 12/1977 | Evans | 192/58 B |
| 4,086,990 | 5/1978 | Spence | 192/58 B |
| 4,090,596 | 5/1978 | Blair | 192/58 B |
| 4,257,501 | 3/1981 | Woods | 192/82 T X |
| 4,458,798 | 7/1984 | Bopp | 192/58 B |
| 4,557,032 | 12/1985 | Wilson | 29/434 |
| 4,615,096 | 10/1986 | Foster | 29/434 |

Primary Examiner—P. W. Echols
Assistant Examiner—Ronald S. Wallace
Attorney, Agent, or Firm—Woodard, Emhardt, Naughton, Moriarty & McNett

[57] ABSTRACT

A fluid shear coupling apparatus is disclosed herein which includes a driving member comprising a rotor mounted to a shaft and defining several annular ridges and grooves. The apparatus further includes a driven member including a bearing housing mounted to the shaft, a cover secured about a perimetric flange with the bearing housing, and a plate secured to the cover and defining several annualr ridges and grooves positioned complementary with the ridges and grooves of the rotor. In the preferred embodiment, the plate, cover, bearing housing and rotor are as-formed structures.

6 Claims, 8 Drawing Sheets

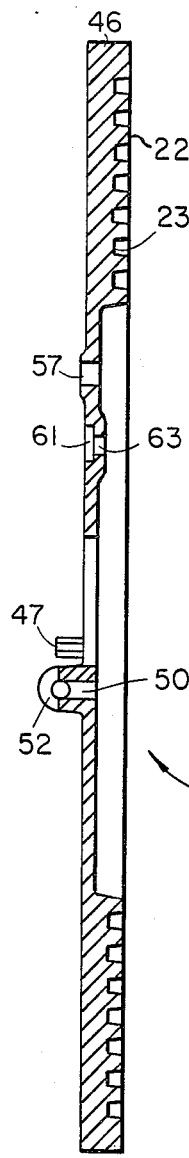
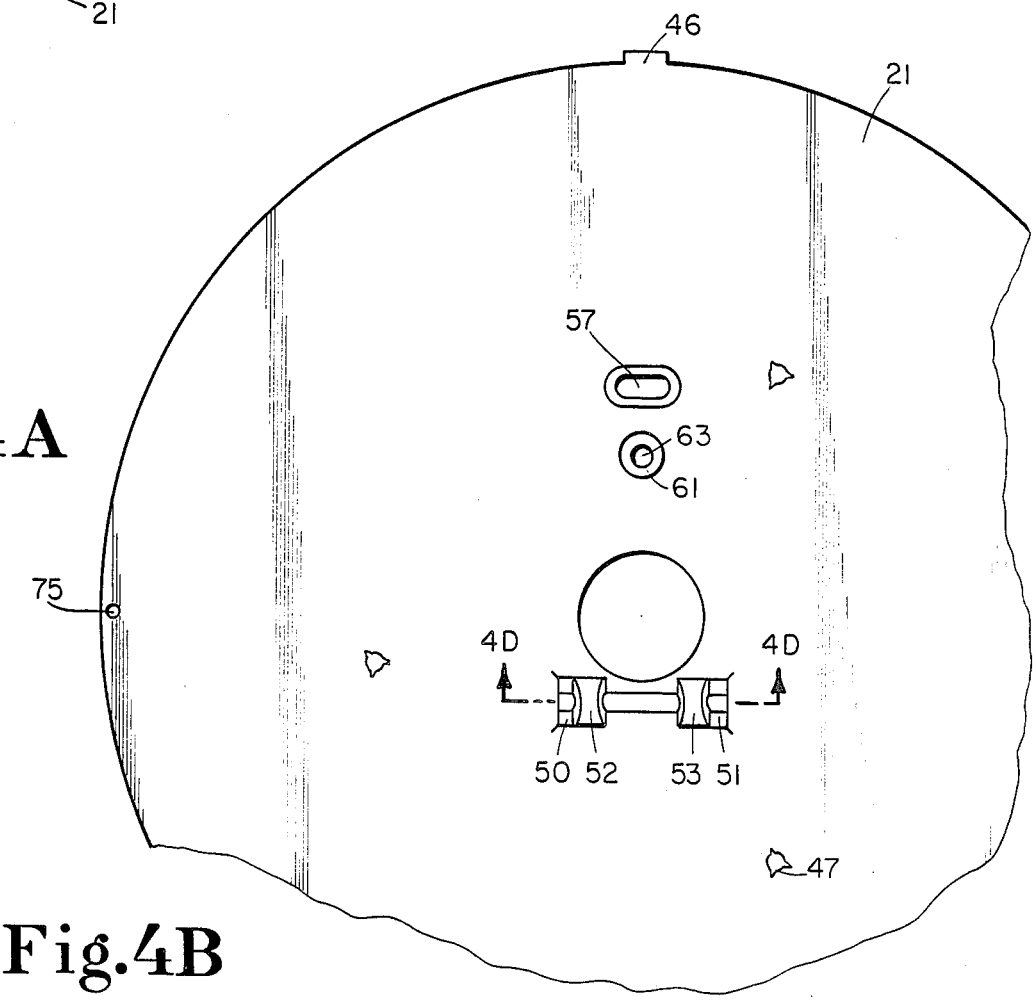
Fig.4A
Fig.4B

FLUID SHEAR COUPLING APPARATUS

This is a continuation application of U.S. patent application Ser. No. 778,296 filed Set. 20, 1985, not abandoned, which is a continuation of U.S. patent application Ser. No. 423,823 filed Sept. 27, 1982, now abandoned.

BACKGROUND OF THE INVENTION

1. Field of the Invention: The present invention relates to the field of fluid shear couplings, and particularly to a coupling of the type used as a vehicle fan drive in which a rotor is received within a driven member.

2. Description of the Prior Art: A variety of fluid shear couplings, also referred to as viscous couplings, have been proposed in the prior art. Many of these couplings include a rotor which is connectable with an external drive source and is received within a housing that defines a fluid shear chamber. Improvements for such couplings have been proposed along many lines including bearing structures, fluid valving, temperature controls and torque transfer. A purpose behind most improvements in fluid shear couplings is the achievement of a coupling which operates efficiently with a minimum of cost and weight. The present invention satisfies all of these conditions.

In the preferred embodiment, the present invention provides a fluid shear coupling which includes interdigitated ridges and grooves to increase the transmission of torque between the rotor and the driven housing. This general feature is disclosed in a number of patents, many of which appear in class 192, subclass 58. Examples of patents which disclose interdigitated ridges and grooves are the following: U.S. Pat. Nos. 3,856,122, issued to Leichliter on Dec. 24, 1974; 3,323,623, issued to Roper on June 6, 1967; and 3,809,197, issued to Clancey on May 7, 1974.

The present invention also provides a unique sealing structure for a temperature-responsive fluid valve. General valving structures are well known in the art and typically assume two forms. One type of valve structure utilizes a valve which is spring-biased to pivot outwardly from a fluid aperture when a control pin is displaced to permit such pivoting. Examples of such valve structures are disclosed in U.S. Pat. Nos. 4,090,596, issued to Blair on May 23, 1978; 4,086,990, issued to Spence on May 2, 1978; 4,036,339, issued to Kikuchi on July 19, 1977; and 3,964,582, issued to Mitchell on June 22, 1976. In each of these patents, the pin slides through a hole in the cover of the coupling. A sealing member is inserted into an annular groove on the inside or fluid side of the cover to seal the sliding control pin. A second type of fluid control valve is one which is rotated to or from the fluid flow aperture, typically in correspondence with a coiled, temperature-sensitive spring. Examples of other types of such valve structures are contained in U.S. Pat. Nos. 4,062,432, issued to Evans on Dec. 13, 1977, and 3,191,733, issued to Weir on June 29, 1965.

Another feature of the present invention is contained in the method and structure for coupling the cover and bearing housing of the apparatus. One of the conventional methods for securing a cover to a bearing housing is by simply bolting the members together. The bolts are typically received through flanges which extend outwardly from the central portion of the coupling at which the shear surfaces are located. This method typically requires the inclusion of a substantial outer flange having a width, along a diameter, of sufficient distance to accommodate the several bolts. A disadvantage of this approach is that the amount and location of such a flange significantly increases the weight of the coupling apparatus and also places that weight at the outer perimeter at which the moment of inertia is the greatest. Also, the method is relatively slow to perform.

A second alternative in the prior art has been to provide either the bearing housing or the cover with a perimetric flange which is then rolled over the edge of the other member to join them together. Examples of this construction are contained in U.S. Pat. Nos. 3,011,607, issued to Englander on Dec. 5, 1961 and 3,007,560, issued to Weir on Nov. 7, 1961. This approach is also shown in the Leichliter, Roper and Clancey patents previously identified. Disadvantages of this procedure include a resultant distortion of the cover faces, and also the slowness of the process.

A further aspect of the present invention relates to the formation, particularly by casting, of certain components of a fluid shear coupling, especially using magnesium or a magnesium alloy. Materials which have conventionally been used in formation of the cover, bearing housing and rotor for prior art devices have included various steel and aluminum compositions. Applicant is not aware, however, of the use of a magnesium alloy for this purpose. A further aspect of the present invention is the inclusion of a plate which defines the several annular ridges and grooves for the driven member of a fluid shear coupling, which plate is mounted to the cover member of the coupling. In the prior art, for those devices which utilize a driven member having annular ridges and grooves, these elements are provided as integral portions of the cover.

SUMMARY OF THE INVENTION

Briefly, describing one aspect of the present invention, there is provided a fluid shear coupling apparatus which includes a driving member including a rotor defining several annular ridges and grooves, and a driven member defining complementary annular ridges and grooves. The driven member includes a bearing housing coupled with a cover, and a plate which defines the ridges and grooves of the driven member is secured to the cover. In another aspect, the several ridges and grooves constitute as-formed structures. In a further aspect, the bearing housing and cover include adjacent, outer perimetric flanges which are secured together by means of a magneformed band received thereover. An additional aspect of the present invention relates to the use of a magnesium alloy for certain components of a fluid shear coupling.

It is an object of the present invention to provide a fluid shear coupling apparatus which is relatively light weight and low in cost, but which operates efficiently.

A further object of the present invention is to provide a fluid shear coupling apparatus which is readily assembled and calibrated.

Another object of the present invention is to provide a fluid shear coupling apparatus which requires fewer and less expensive manufacturing operations.

Further objects and advantages of the present invention will become apparent from the description of the preferred embodiment which follows.

BRIEF DESCRIPTION OF THE DRAWINGS

FIG. 4A is a side, cross-sectional view of a plate insert used in the preferred embodiment of the present invention.

FIG. 4B is an elevational view of the cover side of the plate insert shown in FIG. 4A.

DESCRIPTION OF THE PREFERRED EMBODIMENT

Figures 1, 1A, 2:
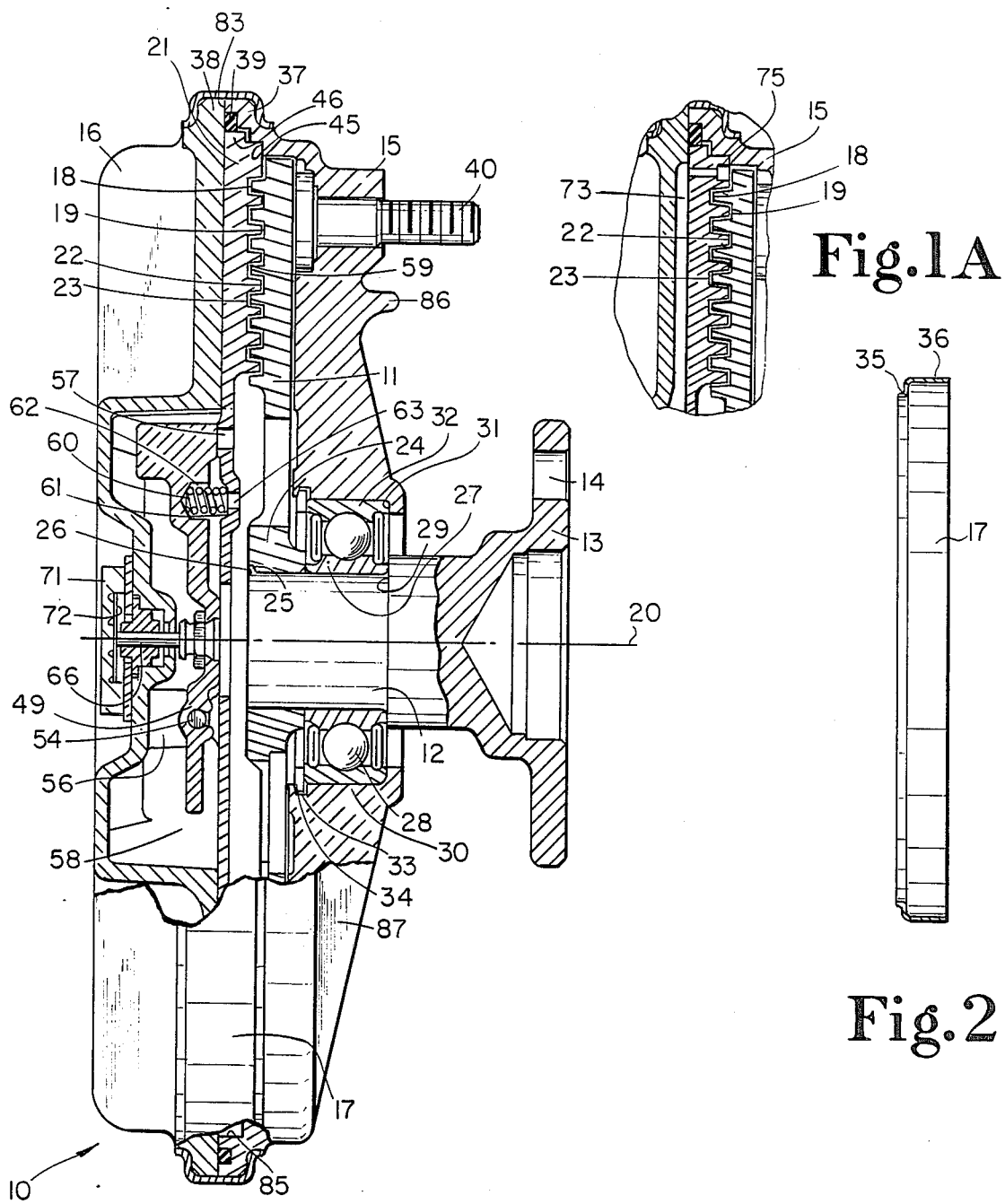
FIG. 1 is a side, partially cross-sectional view of a fluid shear coupling apparatus constructed in accordance with the present invention.
FIG. 1A is a partial cross-sectional view of the apparatus of FIG. 1, and particularly showing the fluid recirculation passageways.
FIG. 2 is a side, cross-sectional view of a band useful in the present invention for joining the bearing housing and the cover.

For the purposes of promoting an understanding of the principles of the invention, reference will now be made to the embodiment illustrated in the drawings and specific language will be used to describe the same. It will nevertheless be understood that no limitation of the scope of the invention is thereby intended. Such alterations and further modifications in the illustrated device, and such further applications of the principles of the invention as illustrated therein, are contemplated as would normally occur to one skilled in the art to which the invention relates.

Referring in particular to the drawings, there is shown a fluid shear coupling apparatus 10 constructed in accordance with the present invention. In FIG. 1 there is shown a coupling apparatus in assembled form, with certain of the components shown more specifically in the subsequent figures.

The preferred embodiment generally comprises a driving member connected with an external drive source, and a driven member mounted to the driving member for relative rotation about a common axis. The driven member includes a bearing housing 15 and a cover 16 secured together by a metal band 17. The driving member includes a disc-shaped rotor 11 secured to a shaft 12. The shaft includes a mounting portion 13 which is connectable to an external drive source, such as by the reception of bolts (not shown) through apertures 14. A typical external drive source is a vehicle engine for an embodiment in which the apparatus 10 is used as a coupling device for driving a plurality of fan blades mounted to the driven member.

The rotor 11 is shown to have several annular ridges 18 and grooves 19 facing in a first direction parallel to the central axis 20. The driven member includes a plate 21 mounted to the bearing housing 15 and cover 16. The plate 21 includes several annular ridges 22 and grooves 23 facing in a second axial direction, opposite the first direction. The ridges and grooves of the plate 21 are received adjacent respective grooves and ridges of the rotor 11. These provide spaced, opposed shear surfaces defining a fluid shear chamber therebetween and cooperable with shear fluid in the fluid shear chamber to transmit torque between the rotor and the plate. The close, spaced-apart positioning of the complementary shaped and located ridges and grooves of the rotor and plate provides for varying degrees of coupling between the driving member and the driven member in relation to the amount of fluid received in the intervening shear chamber, as is well understood in the art.

The driven member and driving member are mounted together to have relative rotation about the central axis 20. The rotor 11 includes an outer, disc-shaped portion which defines the several annular ridges and grooves. The rotor also includes an inner hub portion 24 which is mounted to the shaft 12. Particularly, the hub portion 24 includes several radially-spaced depressions 25 which are utilized in staking the shaft to the rotor, as shown for example in FIG. 1 at 26.

The bearing housing 15 is bearingly mounted to the shaft 12. The inner race 27 of ball bearings 28 is received between the hub portion 24 of the rotor and a shoulder 29 of the shaft 12. The bearing housing 15 defines a central hub portion 30 defining a shoulder 31 against which one side of the outer race 32 of the ball bearings is received. The hub portion further defines a circumferential recess 33 in which a snap ring 34 is received to abut the other side of the outer race 32.

The cover 16 is secured to the bearing housing 15, preferably by means of a magneformed band 17. As shown in FIG. 2, the band 17 has an initial configuration in which one of the shoulders 35 is already formed to conform with a corresponding surface on the perimeter of the cover 16. The main portion 36 of the band is formed at a slight angle, about 2°, from the central axis to facilitate placement of the band onto the housing and cover. The band is positioned on the cover and housing, and the magneforming process is then carried out. The forces generated by the surrounding magnetic field are sufficient to force the band 17 firmly against the outer, perimetric flanges 37 and 38 of the housing 15 and cover 16, respectively, to provide a secure clamping together of these components. The band is readily and quickly applied by this process, with the actual magneforming occurring in a fraction of a second.

Although the general procedure of magneforming is known, it has not been known in the prior art to utilize a magneformed band to join together the typical bearing housing and cover for a fluid shear coupling apparatus. This construction does, however, have distinct advantages over the prior art designs. In particular, it has been the practice to design fluid shear couplings with a substantial amount of material radially outward of the rotor. The necessity for this material was presented in one approach because it was in this region that the bearing housing and cover were secured together by means of bolts. In the alternate approach, this material has been required in the past to be able to roll over material from one component onto the other. The latter method has had the additional disadvantage of causing distortion of the components, reducing the possibility of later disassembling and reassembling the coupling if needed. In the present apparatus, the magneformed band can be readily cut away to permit repair of the coupling.

The use of a magneformed band conversely permits the coupling apparatus to have a minimal amount of material positioned radially outward of the fluid shear surfaces, and particularly of the rotor. This permits the coupling apparatus to be lighter in weight for a given area of shear surfaces, and particularly reduces the weight at the outermost location which would have the highest moment of inertia. Further, the magneformed band provides a simpler and quicker joining of the bearing housing and the cover, reduces the number and cost of materials for the fastening process, and simplifies the configuration of the bearing housing and cover. As shown, the bearing housing and cover include relatively small and simply configured flanges 37 and 38, respectively, about which the band 17 is received. The bearing housing further defines an annular recess in the flange 37 in which an O-ring 39 is received to provide a seal between the bearing housing and the cover.

Figure 3:
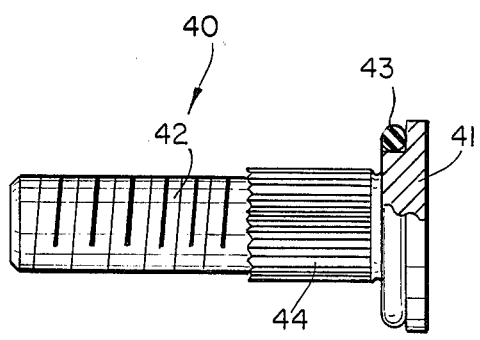
FIG. 3 is a side view, partially in section, showing a screw useful in the present invention.
Figure 4C:
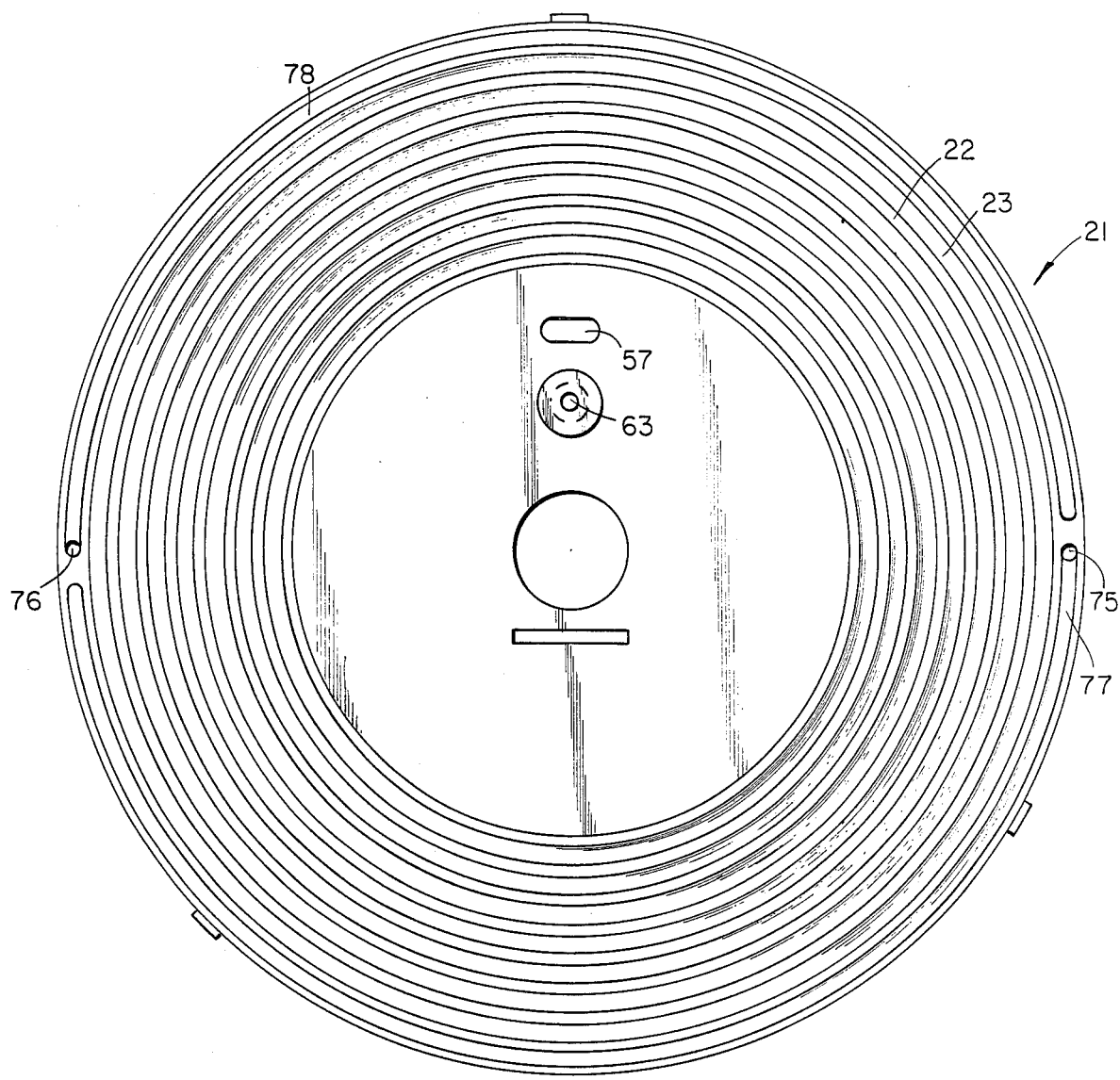
FIG. 4C is an elevational view of the grooved side of the plate insert of FIG. 4A.
Figure 4D:
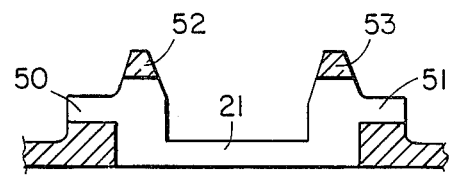
FIG. 4D is a partial, cross-sectional view of the plate insert, taken along the line 4D—4D in FIG. 4B and looking in the direction of the arrows.

As previously indicated, a typical application for the fluid shear coupling apparatus of the present invention is for providing a fan drive in respect to a vehicle engine. In this respect, the bearing housing 15 is provided with several apertures through which bolts, such as 40, are received. As shown particularly in FIG. 3, the bolt 40 preferably comprises a ribbed neck screw having a head 41 and a shank 42. The head includes a perimetric shoulder which receives a silicone seal ring 43. When the bolt is received through the aperture in the bearing housing 15, the seal ring 43 is pressed against the surface of the housing and thereby seals the aperture to prevent fluid loss.

The shank 42 preferably includes a ribbed portion 44 adjacent the head of the bolt and including several axially directed ribs. These ribs are sized to be received in the aperture of the bearing housing and to grip tightly against the surface of the aperture to prevent rotation of the bolt when a nut is applied to the bolt externally of the housing. A simple and reliable technique for mounting a fan blade onto the bearing housing is thereby provided. The bolt 40 is inserted through the aperture in the bearing housing prior to assembly of the coupling apparatus. The ribbed portion 44 holds the bolt within the aperture so that the seal ring effectively seals the aperture, even prior to attachment of the fan blades. The ribbed portion also grips within the aperture to permit the fan blade and fastening nut to be applied on the exposed threaded shank after the coupling has been assembled.

Secured to the cover 16 is a plate 21 which defines the several annular ridges and grooves of the driven member. Specific details for the plate 21 and the cover 16 are provided in FIGS. 4A–4D and 5A–5C, respectively.

As shown in FIG. 1, the bearing housing 15 includes an annular recess 45 in which is received the outer, perimetric edge of the plate 21. The plate is thereby clamped between the bearing housing 15 and the cover 16 when those components are secured together by means of the band 17. As shown particularly in FIG. 4B, the plate 21 is also provided with projections 46 which are received within corresponding recesses in the bearing housing (FIG. 1) to operate as a key to prevent relative rotation of the plate with respect to the cover and bearing housing.

To facilitate assembly and particularly to provide proper alignment of the plate with respect to the cover, the plate is provided with three projections 47 which are received within three corresponding recesses 48 in the cover 16. The fit of the projections 47 in the recesses 48 is sufficient to provide a preliminary attachment between the plate and the cover such that the plate and cover may be assembled together prior to fitting with the bearing housing 15. This is advantageous in facilitating the assembly in general, and also in the calibration of the valve mechanism as described subsequently. As will be apparent from the following description, the projections 47 are used to align the plate with respect to the cover to assure a proper orientation of the valve and other components.

The plate 21 and cover 16 are provided with cooperating projections to carry a valve 49. The plate 21 includes a pair of spaced apart lower pin support surfaces 50 and 51, and also a pair of spaced apart upper pin support surfaces 52 and 53. These supports are positioned to thereby receive a hinge pin 54 (FIG. 1) which in turn supports the valve 49. The cover 16 includes a pair of tabs 55 and 56 which are positioned to fall on opposite sides of the pin supports and the pin when the cover and plate are assembled together. In this fashion, the pin 54 may simply be inserted through the several pin supports 50–53 and the valve 49 and it is retained in that position by the tabs 55 and 56 upon assembly with the cover.

The valve 49 is positioned for opening and closing an aperture 57 to control the flow of fluid between a fluid reservoir 58 and the working or shear chamber 59 defined by the space between the closely positioned ridges and grooves of the plate 21 and rotor 11. A spring 60 is received at one end in a depression 61 of the plate 21, and at the other end in a cavity 62 defined by the valve 49. This spring biases the valve to an open position in which the aperture 57 is open and fluid flow is provided between the reservoir and the working chamber. A bleed hole 63 extends through the plate 21 at the location of the depression 61 to permit a slight bleeding of fluid from the reservoir into the working chamber in conventional fashion.

Figure 6A:
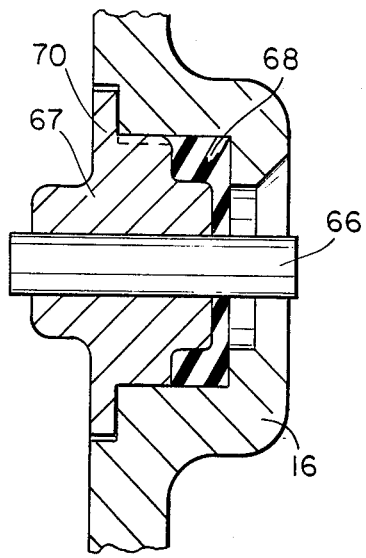
FIG. 6A is a cross-sectional view of a portion of the cover useful in the present invention, particularly showing the valve control pin sealing means.
Figure 6B:
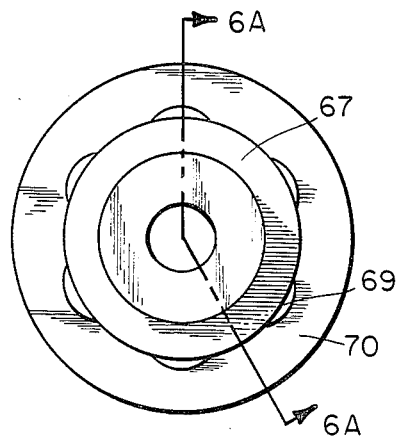
FIG. 6B is an end, elevational view of the seal insert shown in FIG. 6A.
Figure 7:
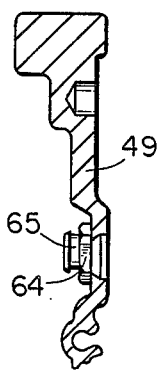
FIG. 7 is a side, elevational view of a valve mechanism useful with the present invention.

Control of the valve 49 is provided by a suitable control mechanism, a variety of which are well known in the prior art. As shown in the preferred embodiment, however, a novel control mechanism is provided hereby. The cover 16 defines a central recess in which is received a seal insert 67 and a seal 68, as shown n FIG. 6A. The seal insert 67 retains the seal 68 in position, and includes several ribs 69 (FIG. 6B) which act to hold the insert in place within the cavity defined by the cover 16. The insert 67 also includes a flange portion 70 which is received within a complementary shaped recess of the cover 16. A bracket assembly 71 (FIG. 1) retains the flange portion 70 of the seal insert in place. The seal insert 67 and seal 68 define aligned apertures in which a piston pin 66 is slidingly received. The valve 49 carries an adjustable, self-clinching nut 64 including a portion 65 against which one end of the pin 66 is received. The bracket assembly 71 maintains a heat strip 72 in position against the other end of the pin 66.

In accordance with the described construction, the heat strip 72 and dowel pin 66 cooperate to control the movement of the valve 49 between open and closed positions. The pin 66 has one end engaging the adjustable portion 65 associated with the nut 64, and the other end abutting the heat strip 72. A change in position of the heat strip 72, such as with changes in ambient temperature, will therefore result in a movement of the pin 66 and a corresponding movement of the valve 49.

The control mechanism is calibrated prior to final assembly of the coupling apparatus. This may be readily accomplished by assembling the plate 21 to the cover 16 which will be held in that position by the projections 47 received within the recesses 48. The self-clinching nut 64 is then adjusted such that the heat strip 72 maintains the valve in the desired, closed position below a certain temperature and permits opening of the valve above the desired temperature. Since the valve 49 is provided with a self-clinching nut, the calibration of the device is maintained after assembly, once it has been determined and set in the appropriate position. In contrast, a disadvantage of certain prior art structures has been that adjustment was not possible, and calibration had to be accomplished by changing the pin 66 until a suitable length was selected.

As will become more apparent in the following description, the provision of the seal insert 67 and seal 68 significantly simplifies the fabrication of the cover 16, while providing aligned apertures within which the pin 66 is received. The seal 68 is made of a suitable material to provide a sufficient seal about its periphery in contact with the recess in the cover 16, and also to provide a sliding seal with the pin 66. The seal insert 67 is received within the cover, as previously described, and is formed of a suitably rigid material to compress the seal within the recess to assure a firm, sealed fit. The insert also maintains the positioning of the seal 68 to provide a suitable contact with the pin 66.

As a result of the presence of these two components, a seal is accomplished with the cover 16 and the pin 66 without a requirement for special treatment of the associated surfaces of the cover 16, other than by the original forming procedures such as casting of the cover with the indicated recesses. In contrast, the prior art devices have typically included a machining of the cover to receive a seal member. It is a feature of the present invention that a fluid shear coupling is provided that requires a minimal amount of processing of such components as the rotor and cover. In the past, it has been typical to first cast the cover, then drill and ream a hole for reception of the valve pin, and then to trepan a groove on the inside in which a sealing boot was glued. Casting of the groove has been difficult because it has been a relatively deep and narrow groove in prior art units. The described design for the present invention avoids these several steps and minimizes the fabrication of the cover. Also, the pin is received in apertures in the seal insert and seal which both provide lower coefficients of friction than the reamed hole provided in the past, and these components are not subject to corrosion. Also, no glue is required by the present construction.

As is apparent from the description, the plate 21 is an integral and substantially closed component. By this it is meant that the plate does not have any substantial openings, particularly at the center, which are required to be closed by a separate closure element. In contrast, the typical prior art couplings have utilized a cover which has the shear surfaces, such as the annular ridges and grooves, as an integral portion. These prior art units have included a central aperture radially inward of the shear surfaces, which aperture is then closed by a separate cover plate provided for defining a fluid reservoir in the cover and for supporting the valve structures.

In contrast, the present device includes a plate 21 which cooperates with the cover to define the fluid reservoir while also having the shear surfaces, preferably the annular ridges and grooves, as an integral portion. The present design therefore permits the valve pin supports 50–53, the fluid aperture 57, the spring depression 61 and the bleed hole 63 to all be readily formed as integral components of the plate 21 at the time of its fabrication. There is no need for providing an additional cover plate which in the prior art was typically staked to the cover for attachment purposes.

Figure 5A:
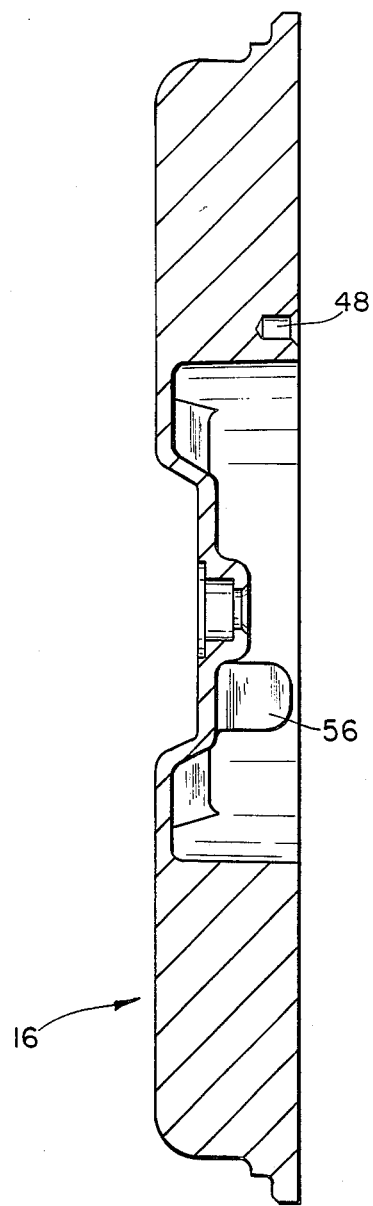
FIG. 5A is a side, cross-sectional view of a cover useful in accordance with the present invention.
Figure 5B:
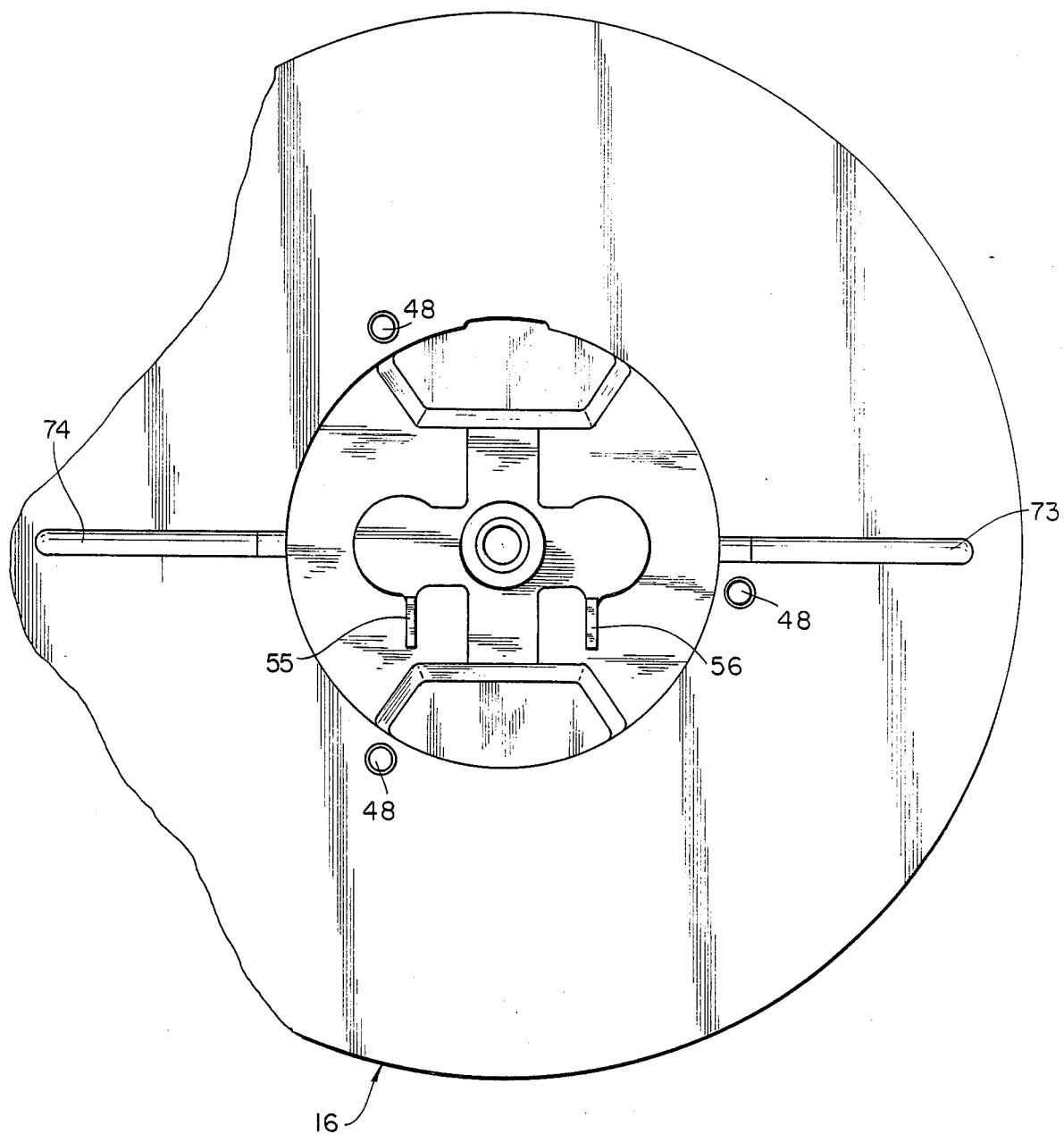
FIG. 5B is an inside, elevational view of the cover shown in FIG. 5A.
Figure 5C:
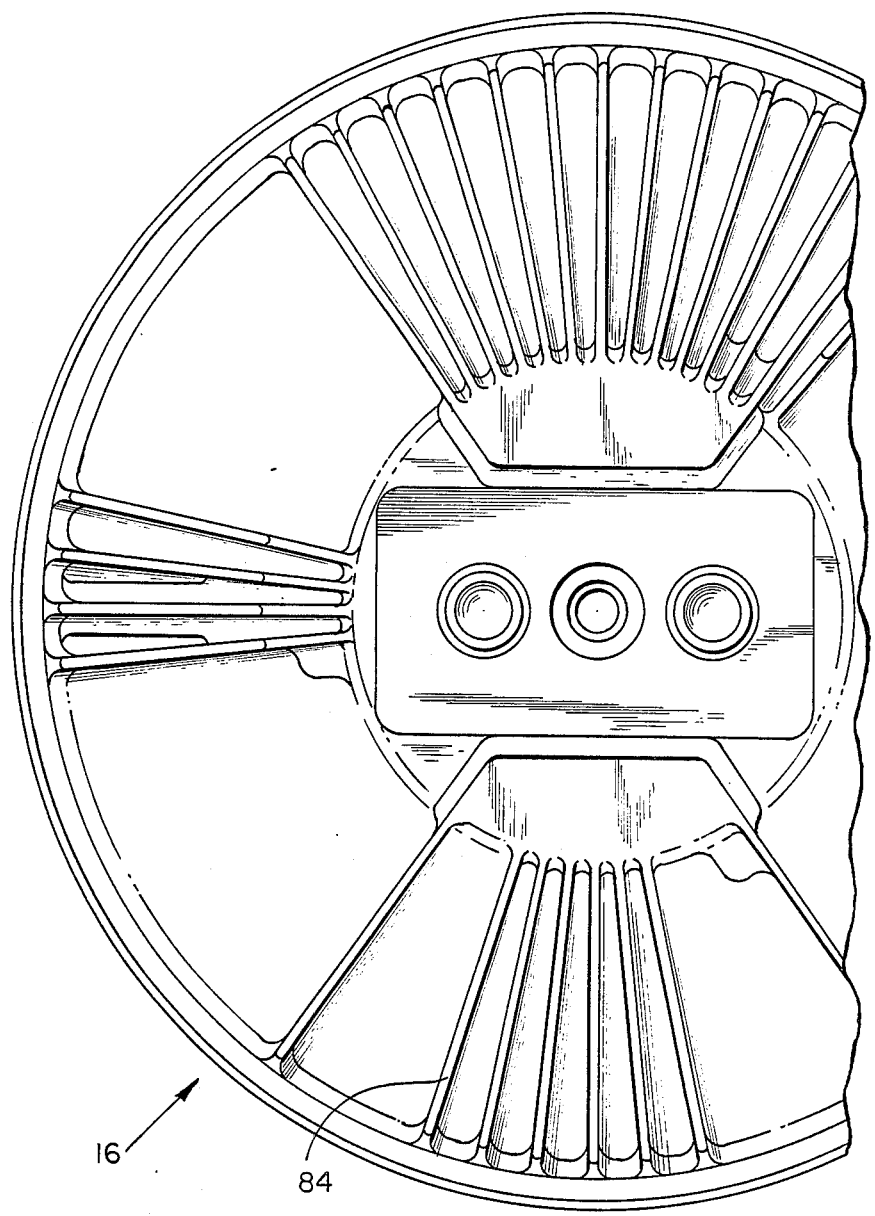
FIG. 5C is an outside, elevational view of the cover of FIG. 5A.

The provision of the plate 21 also simplifies the formation of the recirculation passageways through which fluid moves from the shear chamber back to the fluid reservoir. With prior art designs, it has been necessary to drill and ball the recirculation holes. However, the present construction utilizing the separate cover 16 and plate 21 permits the recirculation passageways to be formed at the time of initial fabrication for these two components. As shown in FIG. 5B, the cover 16 is formed with a pair of radially-extending grooves 73 and 74. The plate 21 includes a pair of corresponding holes 75 and 76 extending through the thickness of the plate and communicating with the outermost annular grooves 77 and 78. The holes 75 and 76 are located to align and communicate with the grooves 73 and 74 upon assembly of the plate 21 to the cover 16. The channels 73 and 74 are thereby positioned to define passageways between the plate 21 and cover 16 which communicate with the respective holes 75 and 76 and with the central fluid reservoir 58. The holes are positioned at the end of the corresponding grooves 77 and 78 such that fluid within the grooves will be forced through the holes 75 and 76 and radially inward along channels 73 and 74 to the fluid reservoir.

A particular feature of the present invention is the provision of major components which are utilized in a substantially as-formed condition. By this it is meant that the components, such as the cover 16 and plate 21, do not undergo any substantial metal working operations after being initially fabricated such as by casting. The components may require minor treatments such as trimming of a casting, but do not require machining or other substantial modifications. Various initial fabrication techniques may be used provided that adequate tolerances may be achieved for that technique and the material being employed. In the preferred embodiment, the as-formed components are cast from a magnesium alloy. Examples of alternate methods include molding of the components from a plastic material, or preparing a sintered, powdered metal component. Plastic components particularly for the plate and rotor are suitable. However, appropriate modifications may be necessary in order to deal with the physical properties of the plastic, such as its reduced heat transfer characteristics. Powdered metal components have been found to work well in the described configurations, although in certain applications the cost of that fabrication technique is less economical.

The plate 21 and rotor 11 are preferably provided in an as-cast condition. The rotor is press fit upon the shaft 12 and staked thereto as previously described. It is important that the central aperture 79 (FIG. 8) be accurately sized for fitting upon the shaft 12. It is also important that the several annular ridges 18 and grooves 19 be concentric with the axis 20 of the shaft 12 and be square, i.e. normal to the axis. Centering and squaring of the central aperture of the rotor may therefore be accomplished after initial casting, as well as trimming of the outer diameter. The back of the hub portion of the rotor, which abuts the inner bearing race 27, is also closely controlled, preferably within four one-thousandths of an inch. This serves as a control on the closeness of the rotor to the ridges and grooves of the plate 21, and to the recirculation grooves and dams on the plate.

Control over these and the other various tolerances for the rotor is accomplished by utilizing a suitable fabrication technique. The preferred technique is to die cast the rotor using a magnesium alloy. This method provides highly accurate tolerance control to the degree appropriate for formation of this component.

Figure 8:
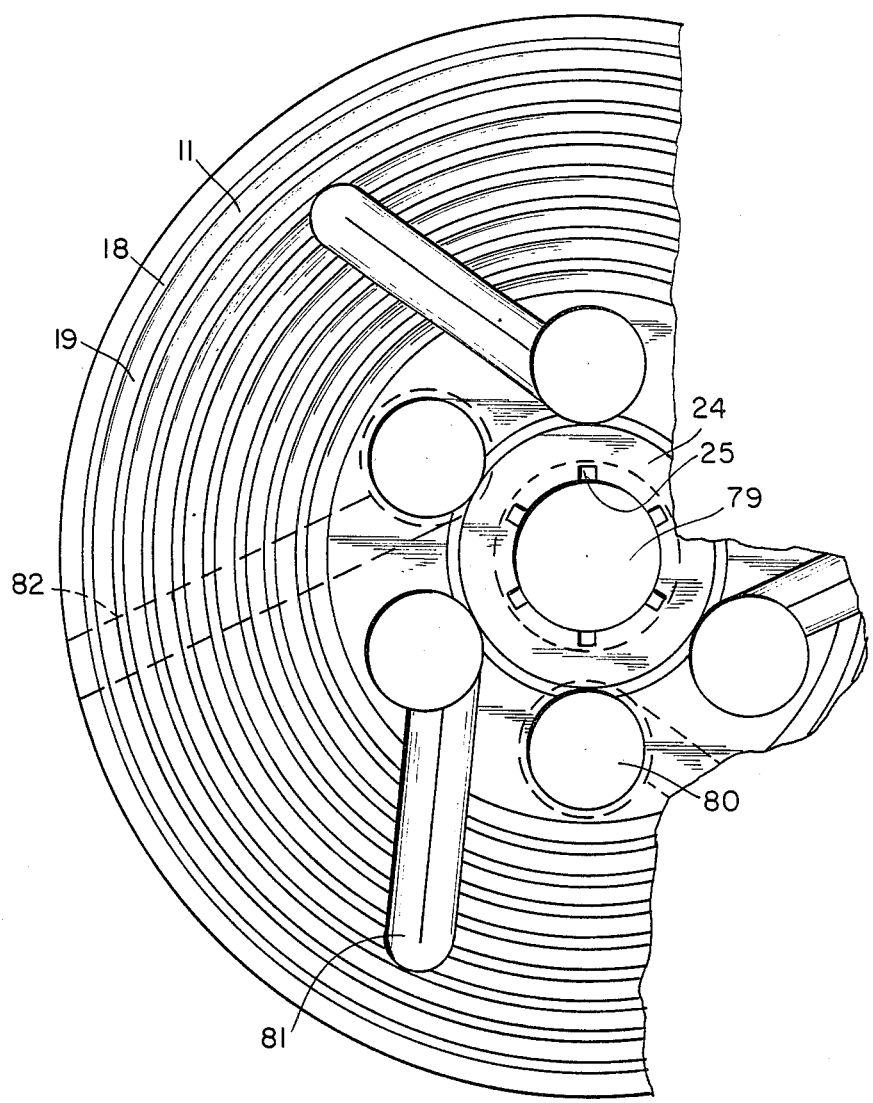
FIG. 8 is a front, elevational view of the grooved side of the rotor shown in FIG. 1.

As shown particularly in FIG. 8, the rotor 11 is formed with several holes 80 to permit the passage of shear fluid from one side of the rotor to the other, as is understood in the art. Also known in the art is the function of the secant grooves 81 which preferably extend outwardly from three of the holes 80 on the grooved side of the rotor, and also of the secant grooves 82 which preferably extend outwardly from the other three holes 80 on the opposite side of the rotor.

The plate 21, and particularly the ridges 22 and grooves 23, are similarly controlled within desired tolerances. The entire plate 21 is suitably fabricated by die casting also from the preferred, magnesium alloy. Consequently, the gaps between associated ridges and grooves of the plate 21 and rotor 11 are readily controlled to provide the desired operating characteristics for the fluid shear coupling of the present invention.

It will be appreciated that the tolerances which may readily be achieved by a casting or other molding or forming process are not as precise as may be achieved by other techniques such as machining. It may therefore be desirable to have larger nominal gaps between the end and side surfaces of the associated ridges and grooves of the rotor and plate. It has also been found that wider grooves and ridges may be used and are preferred for the various reasons cited herein. In prior art couplings which include interdigitated ridges and grooves, the ridges and grooves have typically been in the range of 0.040 inches in width. In contrast, the present device preferably has widths for the ridges and grooves of at least about 0.080 inches, with the preferred widths being 0.125 inches.

As a result of widening the gaps between the shear surfaces, a decrease in torque transfer is produced. However, the decrease in the amount of torque transfer is offset by the fact that the effective viscosity of the fluid increases for the widened gaps. The present invention deals with the decrease in torque transfer by other means as well. First, the provision of an integral plate 21 provides a greater radial distance within which the ridges and grooves may be located, thus permitting a greater number of ridges and grooves for a given outside diameter.

Second, it has previously been indicated that the desired coupling mechanism for the cover 16 and bearing housing 15 is the use of a magneformed band 17. The use of the magneformed band eliminates the need for a significant amount of material extending radially outward of the shear surfaces as a means for coupling the cover and bearing housing. Thus, the shear surfaces may be located more radially outward for a given outside diameter of the overall coupling device. As shown for example in FIG. 1, the present invention includes fluid shear surfaces which preferably extend outwardly to within one-half inch of the periphery of the apparatus. Therefore, although the torque factor is reduced in the sense that the gaps between shear surfaces are wider, this is offset by providing for a greater area of shear surfaces for a given outside diameter of the coupling for the reasons described.

The cover 16 is also provided as an as-formed component, preferably being die cast from a magnesium alloy. The cover is fabricated with the various features, such as the grooves 73 and 74, being cast as an integral portion of the cover. To provide a suitable mating surface with the flange 37 of the bearing housing, the cover is cast with a flange 38 that is flat at the surface 83. This provides for a proper fit with the bearing housing, and also facilitates the sealing of this juncture by means of the O-ring seal 39 received therebetween. All of the other various features of the cover 16 are also suitably provided in the initial fabrication of the cover. These other features, which are preferably cast as an integral portion of the cover, include the tabs 55 and 56 for retaining the valve pin, the recesses 48 for receiving the aligning projections of the plate, and the cooling fins 84, shown particularly in FIG. 5C.

The present invention thereby provides a cover 16, plate 21 and rotor 11, all of which are suitably provided by as-formed components. In prior art devices of a comparable nature, the counterparts for these components have typically required machining, drilling, reaming, trepaning, staking and perhaps other steps to arrive at the required components. The annular ridges and grooves, for example, have been machined in the past. Particular surfaces of the cover have also required such operations as previously indicated. In certain prior art devices, the costs associated with the machining of these components may contribute as much as one-fourth of the cost of the fluid shear coupling. Eliminating the need for these operations is therefore distinctly advantageous both in terms of time and expense in preparing the coupling apparatus.

In accordance with the present invention, the bearing housing 15 is also suitably fabricated by die casting from a magnesium alloy. The bearing housing does include, however, certain surfaces which are machined. The cylindrical surface 85 of the annular recess 45, within which the plate is received, is machined to a suitable inside diameter. The outside diameter of the plate does not require machining, but is trimmed after casting to provide a fit within the machined recess. The bearing housing is also suitably balanced and centered.

Also in contrast to prior art devices, the present coupling does not require a two step procedure in finishing the bearing housing. In the past, the procedure typically included chucking the inside of the bearing housing while a pilot surface was machined on the outside. The outside was then chucked and the annular grooves or other surfaces were machined in the inside as required. The problem with this approach has been that a substantial portion of the mass of the bearing housing was on the initially unchucked side. The resulting housing could therefore be significantly out of balance after machining.

In accordance with the present invention, the outer, heavy side of the bearing housing is accurately cast. That side may then be chucked, such as as the flanges 86, while the inside surfaces are machined. This diminishes the amount that the resultant housing may be out of balance, thus simplifying any subsequent balancing operation.

Balancing of the bearing housing of the present invention may be accomplished in a variety of fashions, such as by the removal of a portion of the fins 87 (FIG. 1). An alternate technique is to remove material by drilling several small holes about the perimeter of the bearing housing at a location which places the holes under the magneformed band when it is applied. Alternatively, holes are cast in the outermost flange 37 of the bearing housing and then selected ones are filled to provide balancing prior to application of the magneformed band.

As has been indicated, it is preferred that the components of the present invention are formed from a magnesium alloy. As used herein, the term magnesium alloy is used to define a metal alloy which includes at least about 85 percent magnesium, and may preferably include at least as much as about 90 percent magnesium. An example of a magnesium alloy which has been found to be particularly well suited to the present invention is the alloy known under the designation AZ91B which may include as components 8.5–9.5 percent aluminum, 0.15 percent minimum manganese, 0.45–0.9 percent zinc 0.20 percent maximum silicon, 0.25 percent maximum copper, 0.01 percent maximum nickel, 0.30 percent maximum other impurities, and the remainder as magnesium.

It has been found that magnesium and magnesium alloys may be utilized to form the indicated components for a fluid shear coupling apparatus with suitable tolerances and physical parameters. The components have substantially the same tolerances as those utilized in the prior art by other fabrication techniques, but are able to be achieved by a casting process by the use of the magnesium or magnesium alloy. It has been found that the die cast magnesium alloy has excellent tolerance control and provides three to five times the die life as is achieved with certain other metals such as aluminum, which along with steel is the typical metal used in prior art coupling devices.

The use of magnesium components permits the use of thinner walls, resulting in better heat transfer and lighter weight. In the field of fluid shear couplings, weight is an important factor. An apparatus as described herein may have an overall weight of about 4 pounds, whereas a comparable prior art device would weigh as much as 5½ to 8½ pounds. The use of magnesium components has also been found to be advantageous in terms of minimized vibration and extended bearing life, due in part to the lighter weight of the components. In order to ensure against possible corrosion problems for the outer surfaces of the coupling apparatus, the coupling is preferably coated with a suitable protective material.

Magnesium and magnesium alloys have been found to be excellent materials for the fabrication of various components for a fluid shear coupling apparatus. As described herein, the magnesium alloy is particularly suited for the cover, plate, rotor and bearing housing. The advantages achieved by use of magnesium and its alloys are applicable to the variety of fluid shear couplings described herein and in the prior art, particularly in the use of thinner walls, and achievement of better heat transfer and lighter weight as a result.

To the extent that a coupling apparatus requires machining, proper precautions should be taken in the removal and disposal of the magnesium chips which will burn intensely if not properly handled. However, the machining of magnesium and its alloys is practical both physically and economically, and will yield not only a superior fluid shear coupling, but will also permit longer tool life and the use of reduced horsepower during fabrication.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of forming a fluid shear coupling apparatus which comprises the steps of:
    a. providing a driving member including a rotor having a disc-shaped portion defined several annular ridges and grooves facing in a first direction, said driving member further including a shaft connectable to an external drive source, the rotor being mounted to the shaft;
    b. providing a driven member defining a chamber within which the rotor is received, said driven member defining several annular ridges and grooves facing in a second direction opposite the first direction, the ridges and grooves of said driven member being received adjacent respective grooves and ridges of said rotor and providing spaced, opposed shear surfaces defining a fluid shear chamber therebetween and cooperable with shear fluid in the fluid shear chamber to transmit torque between said driving member and said driven member;
    said providing of steps a. and b. comprising the casting of the annular ridges and grooves of at least one of said driving member and said driven member; and,
    c. mounting said driven member to said driving member to be rotatable about a common axis.

2. The method of claim 1 in which said providing of steps a. and b. comprises the casting of the annular ridges and grooves of both of said driving member and said driven member.

3. The method of claim 1 in which the casting of the annular ridges and grooves comprises the casting of a magnesium alloy.

4. A method of forming a fluid shear coupling apparatus which consists of the steps of:
    a. providing a driving member including a rotor having a disc-shaped portion defining several annular ridges and grooves facing in a first direction, said driving member further including a shaft connectable to an external drive source, the rotor being mounted to the shaft;
    b. providing a driven member defining a chamber within which the rotor is received, said driven member defining several annular ridges and grooves facing in a second direction opposite the first direction, the ridges and grooves of said driven member being received adjacent respective grooves and ridges of said rotor and providing spaced, opposed shear surfaces defining a fluid shear chamber therebetween and cooperable with shear fluid in the fluid shear chamber to transmit torque between said driving member and said driven member;

said providing of steps a. and b. comprising the casting of the annular ridges and grooves of at least one of said driving member and said driven member; and, c. mounting said driven member to said driving member to be rotatable about a common axis.

5. The method of claim 4 in which said providing of steps a. and b. consists of the casting of the annular ridges and grooves of both of said driving member and said driven member.

6. The method of claim 4 in which the casting of the annular ridges and grooves consists of the casting of a magnesium alloy.

* * * * *